(No Model.)

F. W. MOSELEY.
COMPOUND FAUCET.

No. 306,169. Patented Oct. 7, 1884.

Witnesses:
L. C. Hills
Wm. S. Duvall

Inventor
Fredrick W. Moseley
By E. B. Stocking
Atty.

UNITED STATES PATENT OFFICE.

FREDRICK W. MOSELEY, OF POULTNEY, VERMONT.

COMPOUND FAUCET.

SPECIFICATION forming part of Letters Patent No. 306,169, dated October 7, 1884.

Application filed February 16, 1884. (No model.)

*To all whom it may concern:*

Be it known that I, FREDRICK W. MOSE-LEY, a citizen of the United States, residing at Poultney, in the county of Rutland and State of Vermont, have invented certain new and useful Improvements in Compound Faucets, of which the following is a specification, reference being had therein to the accompanying drawings.

The object of my invention is to provide means for the withdrawal of liquids of different specific gravity when contained in one vessel, which means shall comprise a single discharge-passage, and such an arrangement of conduits thereto as shall permit the selection at will of either liquid to be drawn from the vessel. The arrangement and construction of the elements herein shown are applicable to the separate withdrawal of oil and water in oil distillation, milk and cream and whey and curd in dairy apparatus, and all liquids and any sediments therein in all arts requiring the separation of these substances without undue agitation.

My invention is also applicable to the withdrawal of liquids through a single discharge-passage when contained in different vessels or in different compartments of a single vessel.

Certain features of construction herein shown and described are not herein claimed, as they form the subject-matter of companion applications, Cases A, C, and D.

Figure 1:
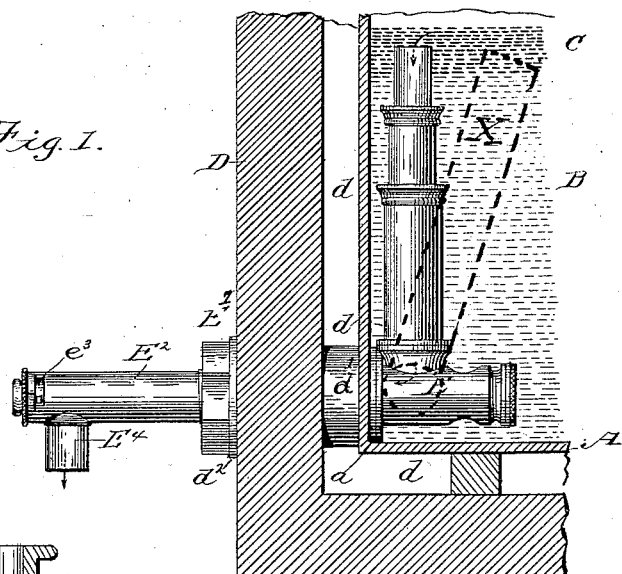
Figure 2:
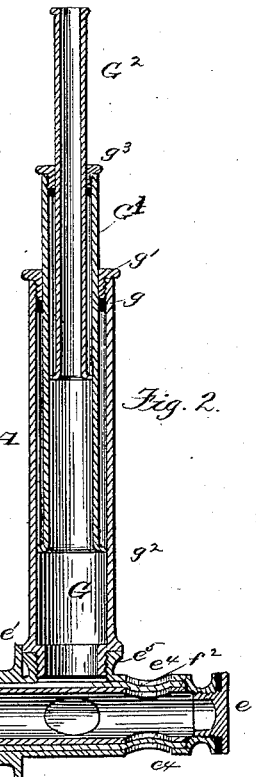
Figure 3:
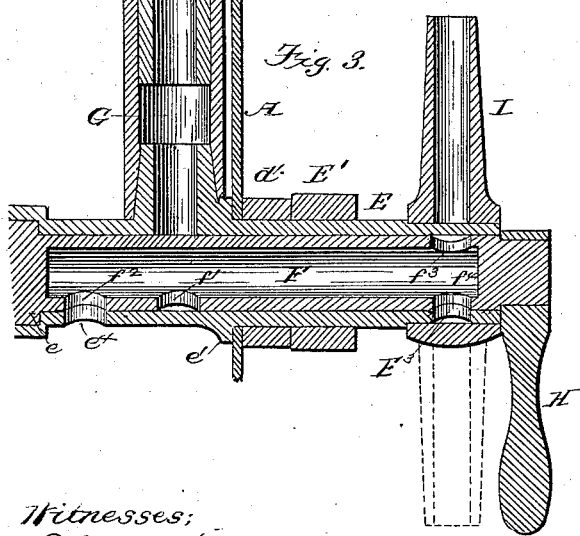

In the drawings, Figure 1 is a side elevation of a compound faucet and certain adjuncts thereto, the whole constructed in accordance with my invention, and illustrated as attached in operative position to a jacketed vessel, a portion of which only is shown. Fig. 2 is a central vertical section of the faucet detached with its elements arranged in different positions than shown in Fig. 1. Fig. 3 is a central vertical section of a modification, and Fig. 4 a similar section of the principal elements of Fig. 3 in a different relative position.

Like letters refer to like parts in all the figures.

Although my invention is applicable to all arts which require the separation of liquids having different specific gravities contained in one vessel, or liquids contained in different vessels, or liquids from sediment therein, I have in this instance, for the purpose of rendering my invention clear, selected the separation of cream and milk, either from the other at will, and I therefore do not limit myself to such use of my invention.

A represents a can, tank, or vessel, with the milk represented by light dotted lines B, and the cream represented by heavy dotted lines C. The vessel A is suitably supported above the bottom of a containing vessel or jacket, D, so as to form a space, $d$, in which heating or cooling agents may be introduced for performing various processes upon the liquids contained in the vessel A.

As in the above-mentioned Cases A, C, and D, my invention in this instance comprises a surface-drainage pipe, a discharge-tube, and a discharge-nozzle, each of which possesses novel features of construction, which are hereinafter specifically set forth in the claims. Through the wall of the vessel A and the vessel D, and through the space-packing $d'$, the discharge-pipe E is passed, and by means of its flange $e'$ and the nut E' and suitable packing, $a\ d^2$, the parts are firmly bound together against leakage. The inner end of the discharge-tube may be closed by a screw-cap, $e$, and suitable packing, as shown in Fig. 2, or a construction hereinafter described may be employed in these respects. The discharge-pipe is exteriorly threaded, as at $e^2$, for the reception of the nut E', and interiorly threaded for the reception of an extension, $E^2$, which is provided with an outlet, $E^3$, projecting from the body of the extension, and exteriorly screw-threaded for the reception of an interiorly screw-threaded pipe, $E^4$, the object of which is, that the pipe may be removed in order that the nut E' may be passed over and along the extension $E^2$ of the threaded portion of the discharge-tube.

F represents the discharge-nozzle, as hereinafter designated, which is provided with a lug, $f$, projecting through a slot, $e^3$, in the extension $E^2$. The discharge-nozzle is provided with a port, $f'$, adapted to be thrown into communication with a surface-drainage pipe, G, and with a port or ports, $f^2$, adapted to be thrown into communication with a port or ports, $e^4$, in the discharge-tube, which are arranged to communicate with the body of the vessel.

Figure 4:
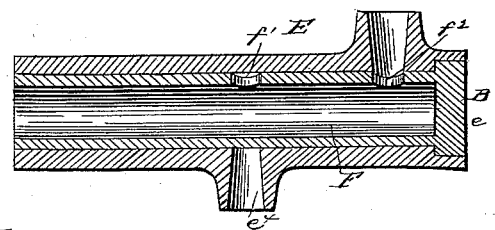

As thus far described it will be seen that when the discharge-nozzle F is turned by means of any suitable handle, as H, so that the lug $f$ is at the lower end of the slot $e^3$, the port or ports $f^2$ are in communication with the port or ports $e^4$ of the discharge-tube, and that the port $f'$ is turned out of communication with the surface-drainage pipe G; hence milk only will be drawn from the vessel. Again, when the discharge-nozzle is turned so that the lug $f$ is at the upper end of the slot $e^3$, the port or ports $f^2$ will be turned out of communication with the port or ports $e^4$, while the port $f'$ will communicate with the surface-drainage pipe G, the cream only may be discharged from the vessel, provided the upper end of the surface-discharge tube extends below the upper surface of the cream in the vessel. In this instance Fig. 1 illustrates a surface-drainage pipe, the upper end of which is in a position to withdraw the cream from the vessel. It will be seen that as milk is withdrawn or any other liquid from the body portion of the can through the discharge-tube E by means of the port or ports $e^4$ the cream or other liquid having the lighter specific gravity will follow the descent of the heavier liquid, and therefore I have provided means for adapting the surface-drainage tube, so far as its length is concerned, to such changes in position of the lighter liquid or cream. For this purpose I construct the surface-drainage pipe in several sections, jointed in any manner to slide in each other, the main or lower section of which is in one instance screw-threaded and shouldered at its lower end to fit a projection, $e^5$, on the upper surface of the discharge-tube. The upper end of said section is interiorly screw-threaded and shouldered for the reception of any suitable packing, $g$, and a screw-cap, $g'$, which is perforated for the passage of a section, $G^1$, the lower end of which is flanged, as at $g^2$, to prevent its complete withdrawal from the main section when the screw-cap $g'$ is screwed thereon. In a like manner section $G'$ is provided with a screw-cap, $g^3$, through which a third section, $G^2$, passes. By this construction a surface-drainage pipe is provided which is adapted for use in the deep cans or vessels used in many arts, and at the same time may be used in partly-filled cans frequently occurring, especially in the dairy arts. The slot $e^3$ in the extension $E^2$ communicates with or has a branch passing completely through and to the end edges of said extension, whereby the discharge-nozzle may be completely withdrawn for cleaning or other purposes. In Fig. 4, however, I have illustrated a modified form of a discharge-nozzle, in that its inner end is closed and seated in the inner end of the discharge-tube, thus serving the purpose of the screw-cap $e$, (shown in Figs. 1 and 2,) and is provided with a single port, $f^2$, for communication with a surface-drainage pipe, and a single port, $f'$, for communicating with a single port, $e^4$. The same modification is also embodied in Fig. 3, where devices are added to the discharge tube and ports of the discharge-nozzle, which act as a stop-cock, so that the parts hereinbefore described may be in position constantly to withdraw either of the liquids contained in the vessel, and yet the discharge of the same through the nozzle may be prevented or permitted at will. But one port $f^2$ is provided at the inner end of the discharge-nozzle, and that is arranged so that it may be made to communicate with a single port $e^4$ at the inner end of the discharge-tube. At the outer end of the discharge-nozzle are two ports, $f^3$, at the side opposite to that on which is the port $f^2$, and a port, $f^4$, directly opposite the port $f^3$, so that either the ports $f^3$ or $f^4$ may successively be brought to communicate with the main discharge-port $F^3$ of the discharge-tube. Upon the outer end of the discharge-tube is rotatably mounted a stop-cock nozzle, I, and upon the outer end of the discharge-nozzle, as in the previous construction, a handle is secured. Now it will be observed that in the position shown the lower liquid in the can may pass through the following ports: $e^4$, $f^2$, $f^4$, and $F^3$, where further passage of the liquid will be stopped by the encircling portion of the nozzle I; but upon turning said nozzle to the position shown in dotted lines the bore of the same will be brought into communication with a port, $F^3$, in the discharge-tube, and hence said liquid will pass through the nozzle from the vessel until the nozzle is again turned to close the port $F^3$. Now, by turning the handle H so as to bring the port $f'$ in communication with the surface-drainage pipe G, the port $e^4$ will be closed and the port $f^3$ be brought into communication with the port $F^3$, when, by manipulating the nozzle as before described, liquid from the upper stratum in the vessel may be drawn at will.

A tilting or pivoted surface-drainage pipe, such as described in Case A and shown by dotted lines X, Fig. 1, may be employed in connection with the discharge pipe and nozzle herein shown.

I do not limit myself to a telescopic surface-drainage pipe which is rigidly connected with the discharge-pipe, nor to the exact proportion and details herein shown and described, but may alter the same in any manner and to any extent within the skill of persons conversant in the construction of similar devices, and I may or may not use any suitable packing at any or all of the joints, which may or may not be screw-threaded. In this instance I have employed a bayonet-slot, $e^3$, and a lug, $f$, as means for limiting the movement of the discharge-nozzle; but I may substitute for the same any well-known equivalent means for the same purpose. So, also, I may substitute any well-known equivalent means for forming a water-tight joint between the vessel or vessels and the discharge-tube for those shown, which consist of the shoulder $e'$ and screw-threaded portion $e^2$ of the discharge-tube and packing $a$, $d'$, and $d^2$.

Having described my invention and its operation, what I claim is—

1. A compound faucet comprising a surface-drainage pipe, a discharge-tube, and a movable discharge-nozzle, substantially as specified.

2. A compound faucet comprising a pivoted surface-drainage pipe, a discharge-tube, and a movable discharge-nozzle, substantially as specified.

3. A compound faucet comprising a surface-drainage pipe, a discharge-tube, a movable discharge-nozzle, and a bayonet-slot and lug for limiting the movement of the nozzle, substantially as specified.

4. In a compound faucet, the combination of a discharge-tube, a discharge-nozzle, and a surface-drainage pipe consisting of a plurality of sections, substantially as specified.

5. In a compound faucet, the combination of a surface-drainage pipe, a discharge-tube, a discharge-nozzle, and a rotatable stop-cock nozzle having communication with the discharge-tube, substantially as specified.

6. The combination of the discharge-tube E, the rotatable stop-cock nozzle I, and the rotatable discharge-nozzle F, substantially as shown and described.

7. The combination of the surface-drainage pipes G G', the discharge-tube E, having the flange $e'$, and ports $e^4$ and $F^3$, with the discharge-nozzle F, having the ports $f' f^2 f^3 f^4$, and a rotatable nozzle, I, and handle H, substantially as shown and described.

8. The combination of the discharge-tube E, surface-drainage pipe G, the rotatable stop-cock nozzle I, and the rotatable discharge-nozzle F, substantially as shown and described.

9. In a compound faucet, the combination of a surface-drainage pipe, a discharge-tube, and a discharge-nozzle rotating therein, the latter having a port to register with a port in the discharge-tube, substantially as and for the purpose set forth.

10. The combination, with a jacketed vessel, of a compound faucet comprising a surface-drainage pipe, a discharge-tube, and a discharge-nozzle, and a suitable nut and packing for forming water-tight joints between the faucet and the vessel, substantially as specified.

In testimony whereof I affix my signature in presence of two witnesses.

FREDRICK W. MOSELEY.

Witnesses:
E. B. STOCKING,
WM. S. DUVALL.